(12) United States Patent
Lavin et al.

(10) Patent No.: US 7,930,669 B2
(45) Date of Patent: *Apr. 19, 2011

(54) STAGE MITIGATION OF INTERCONNECT VARIABILITY

(75) Inventors: Mark A. Lavin, Katonah, NY (US);
Ruchir Puri, Baldwin Place, NY (US);
Louise H. Trevillyan, Katonah, NY (US); Hua Xiang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 12/237,246

(22) Filed: Sep. 24, 2008

(65) Prior Publication Data

US 2009/0019415 A1    Jan. 15, 2009

Related U.S. Application Data

(63) Continuation of application No. 11/370,538, filed on Mar. 8, 2006, now Pat. No. 7,448,014.

(51) Int. Cl.
*G06F 17/50* (2006.01)
(52) U.S. Cl. .................................. 716/126; 716/129
(58) Field of Classification Search ............... 716/2, 18, 716/132–135
See application file for complete search history.

(56) References Cited

U.S. PATENT DOCUMENTS

| | | | |
|---|---|---|---|
| 5,341,310 A | 8/1994 | Gould et al. | |
| 6,230,304 B1 | 5/2001 | Groeneveld et al. | |
| 6,567,967 B2 | 5/2003 | Greidinger et al. | |
| 6,714,903 B1 | 3/2004 | Chu et al. | |
| 7,080,342 B2 | 7/2006 | Teig et al. | |
| 7,448,014 B2 * | 11/2008 | Lavin et al. | 716/12 |
| 2005/0037522 A1 | 2/2005 | Smith et al. | |
| 2005/0051809 A1 | 3/2005 | Smith et al. | |
| 2005/0132306 A1 | 6/2005 | Smith et al. | |

FOREIGN PATENT DOCUMENTS

| | | |
|---|---|---|
| EP | 1532670 A2 | 5/2005 |
| WO | 03104921 A2 | 12/2003 |

OTHER PUBLICATIONS

He et al., "Simultaneous Buffer Insertion and Wire Sizing Considering Systematic CMP Variation and Random Leff Variation", ISPD '05, Apr. 3-6, 2005, San Francisco California, pp. 78-85.

(Continued)

*Primary Examiner* — Jack Chiang
*Assistant Examiner* — Binh C Tat
(74) *Attorney, Agent, or Firm* — Brian Verminski; Hoffman Warnick LLC

(57) ABSTRACT

The present invention provides a method, system and program product for mitigating effects of interconnect variability during a design stage of a chip. Under the technique of the present invention, a global and detailed routing of interconnects of the chip are determined. Thereafter, a dummy fill estimation and a grid based metal density estimation are performed. Then, based on a CMP model, a variable map of metal thicknesses is obtained. Based on the variable map, wiring nets of the chip that are sensitive to metal variability (e.g., that fail to meet timing closure due to metal thickness loss/gain in the CMP process) are identified. These wiring nets are then re-routed for optimization of the chip.

9 Claims, 11 Drawing Sheets

OTHER PUBLICATIONS

Ellis et al., "Compression Algorithms for "Dummy Fill" VLSI Layout Data", Proceedings SPIE Conference on Design and Process Integration for Microelectronic Manufacturing, Feb. 2003, pp. 233-245.

Chen et al., "Hierarchical Dummy Fill for Process Uniformity", Proceedings Aisa and South Pacific Design Automation Conference, Jan. 2001, pp. 139-144.

Chen et al., "Performance-Impact Limited Area Fill Synthesis", Proceedings ACM/IEEE Design Automation Conference, Jun. 2003, pp. 22-27.

Tian et al., "Dummy-Feature Placement for Chemical-Mechanical Polishing Uniformity in a Shallow-Trench Isolation Process", Proceedings International Symposium on Physical Design, 2001, pp. 118-123.

Chen et al., "Practical Iterated Fill Synthesis for CMP Uniformity", Proceedings ACM/IEEE Design Automation Conference, Jun. 2000, pp. 671-674.

He et al., "Design of Integrated-Circuit Interconnects with Accurate Modeling of Chemical-Mechanical Planarization", International Society for Optical Engineering (SPIE) Symposium on Microlithography, Mar. 2005.

Tian et al., "Model-Based Dummy Feature Placement for Oxide Chemical-Mechanical Polishing Manufacturability", Proceedings Design Automation Conference, 2000, pp. 667-670.

Nagaraj NS et al., "BEOL Variability and Impact on RC Extraction", DAC 2005, Jun. 13-17, 2005, Anaheim, California, pp. 758-759.

Chen et al., "Area Fill Generation with Inherent Data Volume Reduction", Proceedings of the Conference on Design, Automation and Test in Europe, vol. 1, 2003.

Lavin et al., U.S. Appl. No. 11/370,538, filed Mar. 8, 2006, Office Action Summary, Aug. 24, 2007, 10 pages.

Lavin et al., U.S. Appl. No. 11/370,538, filed Mar. 8, 2006, Office Action Summary, Jan. 2, 2008, 7 pages.

Lavin et al., U.S. Appl. No. 11/370,538, filed Mar. 8, 2006, Notice of Allowance and Fee(s) Due, Jun. 30, 2008, 9 pages.

* cited by examiner

US 7,930,669 B2

STAGE MITIGATION OF INTERCONNECT VARIABILITY

REFERENCE TO PRIOR APPLICATIONS

This application is a continuation application of U.S. patent application Ser. No. 11/370,538, filed on Mar. 8, 2006, now U.S. Pat. No. 7,448,014, which is hereby incorporated by reference.

BACKGROUND OF THE INVENTION

1. Field of the Invention

The present invention generally relates to mitigation of interconnect variability of an integrated circuit ("chip"). Specifically, the present invention provides a way to mitigate interconnect variability of a chip during its design stage.

2. Related Art

In nanometer-scale Very Large-Scale Integration (VLSI), the design of a chip is increasingly affected by the variability in the back end of the line (BEOL), or interconnect resistance and capacitance. The mismatch between design and manufacturing has to be well controlled in order to guarantee performance and manufacturability. Chemical-Mechanical Polishing (CMP) is widely used as a primary technique in modern integrated circuit fabrication. In this process, after depositing one layer of material on previous layers of material along with an insulating dielectric, CMP is used to planarize the surface layer. Global planarization is typically necessary for establishing reliable multilevel copper interconnects. On the other hand, CMP planarization is not only affected by the manufacturing process, but also it is related to the design itself Experimental results show that metal thickness is closely related to the metal density of the design layout.

To reduce the metal density variation so as to help produce a more flattened layout, two techniques are widely used. Under one technique, "dummy fills", which are tiny metal squares or rectangles, are inserted in low density regions to equalize the spatial density. Under the second technique, holes are formed (i.e., known as "cheesing") on wide wires in order to reduce the metal density. However, both techniques are applied in the post-design process. Although these techniques can improve the layout density evenness, the introduction of millions of dummy fills and cheese holes may affect interconnect signal delay and crosstalk due to the resistance and the coupling capacitance changes. More importantly, these post-design processes represent a more "passive" compensation since the design is fixed already. Only simple local changes can be applied, and the compensation is strictly constrained by the existing design. Moreover, it is highly likely that some regions in the layout cannot reach the required metal density even with dummy fills or cheesing holes. Still yet, if there are critical nets that traverse these regions, the wire thickness of these nets may be out of the design range due to the thickness loss/gain caused by the CMP process. As such, these nets may fail to meet the timing closure.

In view of the foregoing, there exists a need for an improved technique for mitigating interconnect variability. Specifically, a need exists for a technique that mitigates interconnect variability during the design stage of a chip to avoid the problems described above.

SUMMARY OF THE INVENTION

In general, the present invention provides a method, system and program product for mitigating effects of interconnect variability during a design stage of a chip. Under the technique of the present invention, a global and detailed routing of interconnects of the chip are determined. Thereafter, a dummy fill estimation and a grid based metal density estimation are performed. Then, typically based on a CMP model, a variable map of metal thicknesses is obtained. Based on the variable map, wiring nets of the chip that are sensitive to metal variability (e.g., that fail to meet timing closure due to metal thickness loss/gain in the CMP process) are identified. These wiring nets are then re-routed for optimization of the chip.

A first aspect of the present invention provides a method for mitigating effects of interconnect variability of a chip, comprising: performing global and detailed routing of interconnects of the chip; and during a design stage of the chip: performing dummy fill estimation based on the global and detailed routing of the interconnects; performing grid based metal density estimation; and obtaining a variable map of metal thicknesses.

A second aspect of the present invention provides a computer-implemented method for mitigating effects of interconnect variability during a design stage of a chip, comprising: performing global and detailed routing of interconnects of the chip; performing dummy fill estimation based on the global and detailed routing of the interconnects; performing grid based metal density estimation; obtaining a variable map of metal thicknesses; identifying wiring nets of the chip that are sensitive to metal variability based on the variable map of metal thicknesses; and re-routing the wiring nets during the design stage for optimization of the chip.

A third aspect of the present invention provides a system for mitigating effects of interconnect variability during a design stage of a chip, comprising: a routing system for performing global and detailed routing of interconnects of the chip; a dummy fill estimation system for performing dummy fill estimation based on the global and detailed routing of the interconnects; a density estimation system for performing grid based metal density estimation; a variable mapping system for obtaining a variable map of metal thicknesses; a net identification system for identifying wiring nets of the chip that are sensitive to metal variability based on the variable map of metal thicknesses; and an optimization system for re-routing the wiring nets during the design stage for optimization of the chip.

A fourth aspect of the present invention provides a program product stored on a computer readable medium for mitigating effects of interconnect variability during a design stage of a chip, the computer readable medium comprising program code for causing a computer system to perform the following steps: performing global and detailed routing of interconnects of the chip; performing dummy fill estimation based on the global and detailed routing of the interconnects; performing grid based metal density estimation; obtaining a variable map of metal thicknesses; identifying wiring nets of the chip that are sensitive to metal variability based on the variable map of metal thicknesses; and re-routing the wiring nets during the design stage for optimization of the chip.

A fifth aspect of the present invention provides a method for deploying an application for mitigating effects of interconnect variability during a design stage of a chip comprising: providing a computer infrastructure being operable to: perform global and detailed routing of interconnects of the chip; perform dummy fill estimation based on the global and detailed routing of the interconnects; perform grid based metal density estimation; obtain a variable map of metal thicknesses; identify wiring nets of the chip that are sensitive to metal variability based on the variable map of metal thicknesses; and re-route the wiring nets during the design stage for optimization of the chip.

A sixth aspect of the present invention provides computer software embodied in a propagated signal for mitigating effects of interconnect variability during a design stage of a chip, the computer software comprising instructions for causing a computer system to: perform global and detailed routing of interconnects of the chip; perform dummy fill estimation based on the global and detailed routing of the interconnects; perform grid based metal density estimation; obtain a variable map of metal thicknesses; identify wiring nets of the chip that are sensitive to metal variability based on the variable map of metal thicknesses; and re-route the wiring nets during the design stage for optimization of the chip.

Therefore, the present invention provides a technique for mitigating effects of interconnect variability during a design stage of a chip.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
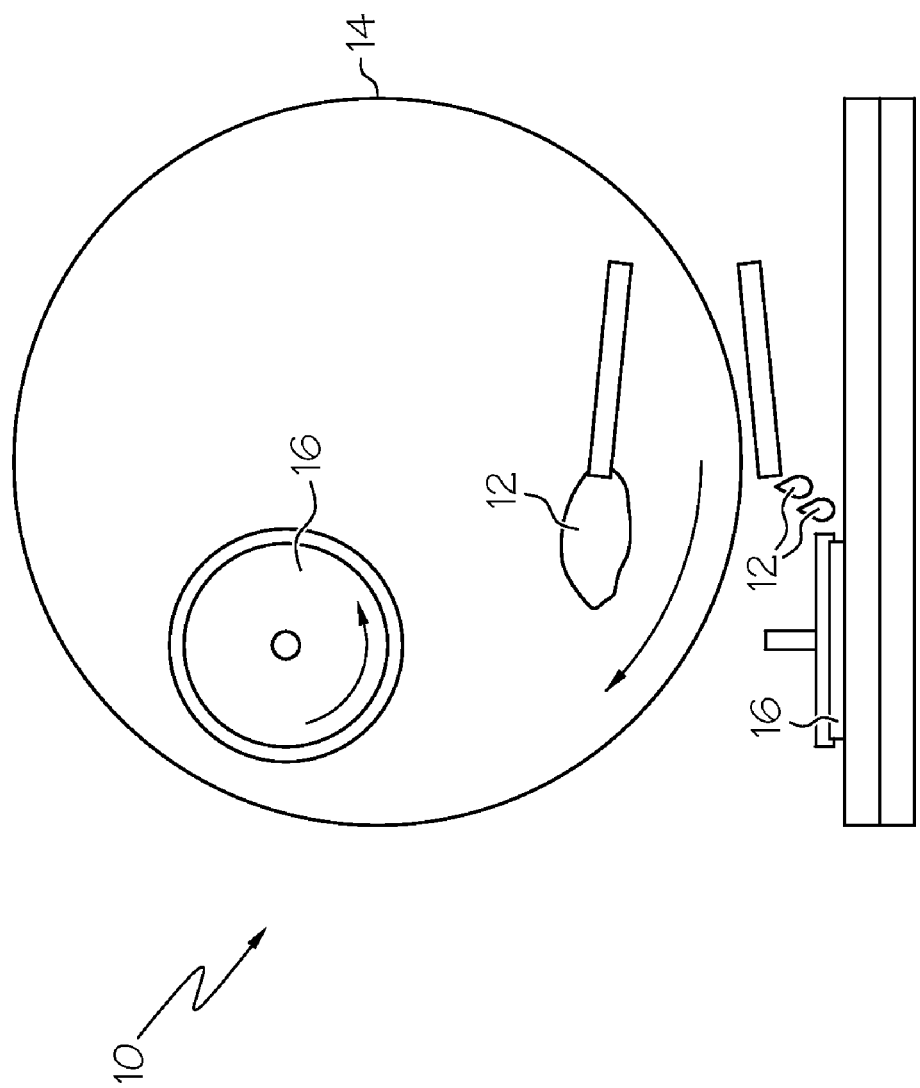
FIG. 1 depicts an illustrative CMP process according to the prior art.

For convenience purposes, the Detailed Description of the Invention will have the following sections:

I. General Description
II. Illustrative Embodiment
III. Computerized Implementation I. General Description As indicated above, the design of chips is often adversely affected by variability in the back end of the line (BEOL). That is, mismatching commonly occurs between the design and manufacturing stages of the chip. One manufacturing stage technique where such variability is typically caused is Chemical-Mechanical Polishing (CMP). Referring to FIG. 1, a diagram 10 of a known CMP process is shown. As depicted, a slurry 12 is distributed at various positions along a polishing pad 14. As force is applied against a chip or wafer 16, the rotational motion of polishing pad 14 causes chip 16 to be polished or planarized. While CMP can be necessary to establish reliable multilevel interconnects, CMP needs to be closely controlled to avoid the aforementioned adverse affects of interconnect variability.

Figure 2:
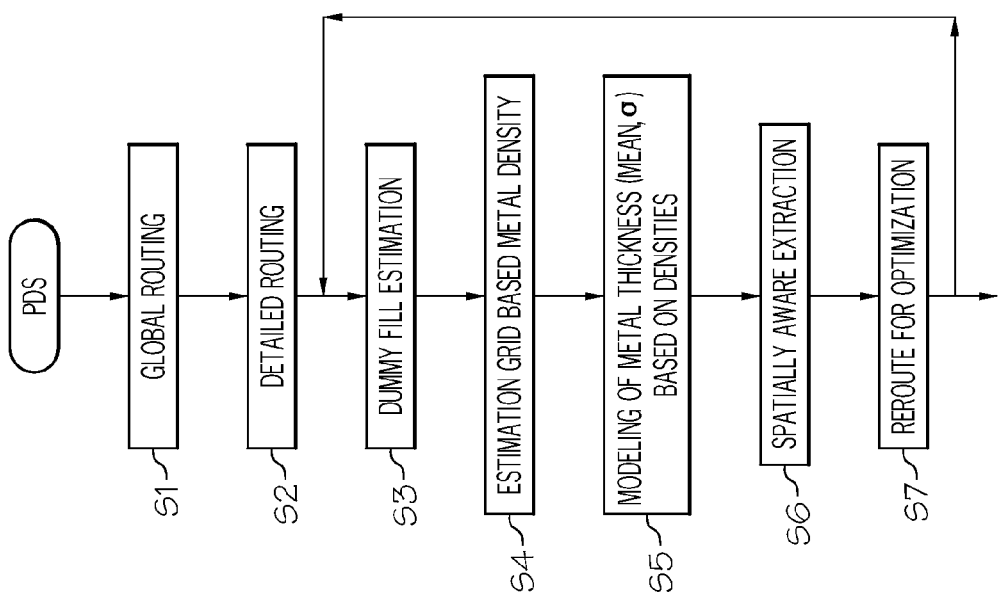
FIG. 2 depicts a method flow diagram according to the present invention.
Figure 3:
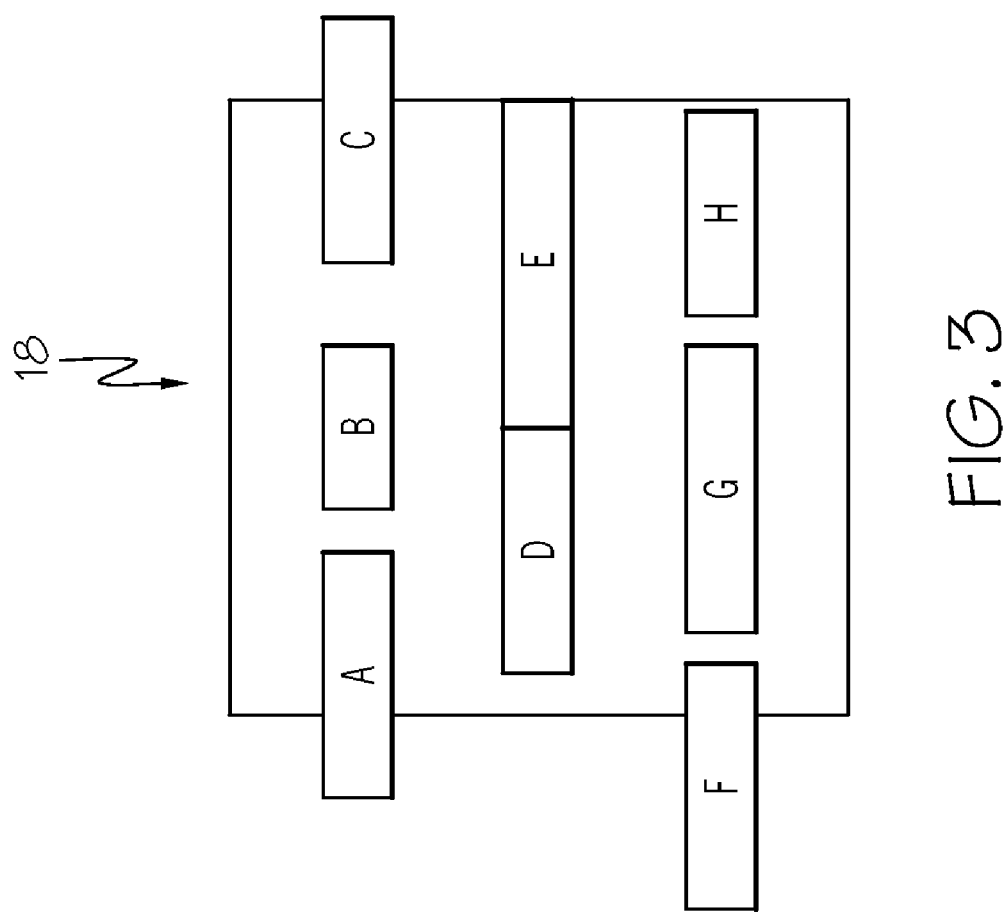
FIG. 3 depicts an exemplary grid cell in which wiring books cross the cell boundary to illustrate the present invention.

Referring now to FIG. 2, a method flow diagram 20 according to the present invention is shown. In general, the method of the present invention is employed during a design stage of the chip. In first step S1, a global routing of the chip is performed. After the global routing, a detailed routing is performed in step S2. In this step, the routing wire distribution is roughly determined while nets are still flexible for rerouting. After global and detailed routing have been performed, the maximum amount of dummy fills can be estimated based on the routing solution in step S3. In addition, based on the global routing result, a grid based metal density estimation is performed in step S4. In general, the metal density of a grid cell (e.g., 20 um×20 um) is the total metal area in the grid cell divided by the grid cell area. After global routing, a rough routing solution is created so that the metal density of each grid cell can be calculated. According to a standard CMP planarization model, the target metal density for each grid cell can thus be derived. Thereafter, using the CMP density-thickness model, a model/map of metal thickness (which can be expressed as a distribution function (mean, $\sigma$)) is obtained in step S5.

After metal thickness has been modeled, a tile-based RC extraction is applied in step S6 to determine the RC values of each wire segment of the chip. In a typical embodiment of the present invention, these values are fed into a statistical timing tool (e.g., "EinsStat"). EinsStat considers (mean, $\sigma$), and identifies wiring nets that are sensitive to the metal variation. These nets may fail to meet timing closure due to the metal thickness loss/gain in CMP manufacturing process. Once these sensitive wiring nets have been identified, they can be rerouted for optimization in step S7.

In general, each wiring net usually has several equal ways to route. For example, a two-pin net from grid (0, 0) to grid (m, n) has m+n−2 possible 2-bend routes. These routes have the same wire length and use two vias. However, the routes may traverse different grid cells. Therefore, a routing path that is more tolerable to CMP process variation will be chosen under the present invention. In addition, after rerouting some wiring nets, the geometry of the layout may have been changed. Accordingly, a re-evaluation of the metal density will be performed and the above-described procedure will be repeated. Specifically, this procedure can be repeated several times until all wiring nets are able to tolerate manufacture variation, or until the iteration reaches a predetermined quantity of times.

It should be understood that although a particular order of steps is shown and described herein, some of the steps could be interchangeable. For example, the dummy fill estimation of step S3 could actually be performed after the grid based metal density estimation of step S4.

II. Illustrative Embodiment

The above-described process will be described in greater detail in this section with reference to FIGS. 3-10. As mentioned above, one or more of the steps of the present invention are performed during the design stage of the chip.

As indicated above, after global and detailed routing of interconnects of a chip are performed, grid based metal density estimation and dummy fill estimation and will be performed so that a modeling of metal thickness can be obtained. In general, the density of each grid cell can be expressed by the following formulae:

Metal_Wire_Area=Power_Rail_Area+Book_Wire_Area+Global_Wire Area+Local_Wire_Area

Metal_Wire_Density=Metal_Wire_Area/Cell_Area
CMP_Density=(Metal_Wire_Area+Dummy_Fill_Area)/Cell_Area In these formulae, Cell_Area is typically pre-decided (e.g., 20 um×20 um). Further, power rails are generally fixed. So, Power_Wire_Area can be accurately pre-calculated and the value will not be changed later. For each power rail segment, its area is Power_Rail_Width * Power_Rail_Height. Power_Wire_Area= Sum of the areas of all power rail segments in the grid cell.

For each "book" in the "library", the metal wire area on each layer can be accurately pre-calculated and the value is not changed. However, some books may cross the grid cell boundaries as the standard books A, C and F have done in diagram 18 of FIG. 3. Since each standard book is treated as a whole (i.e., only the total wire area of each book is known), some type of approximation is needed to handle books crossing grid cell boundaries. To calculate Book_Wire_Area, which books are inside the grid cell should be known. For standard cells, their sizes are much smaller than the grid cell, and their metal wire areas should not affect Book_Wire_Area greatly. Thus, whether a standard cell belongs to a grid cell can be determined based on its center point. Conversely, for large arrays, it may cover several grid cells, and it may not be accurate to assign it to only one grid cell. In this case, the interaction of the book with the grid cell is first calculated, and then the percentage of the intersection against the total book area is determined. The contribution of the wire area from the array is the total book wire area times the percentage. The algorithm is summarized as follows:

```
For each cell in the placement {
    If (ubox_outline_area < threshold)
        {
            X_id = cell_center_x / grid_size;
            Y_id = cell_center_y / grid_size;
            GRID[X_id, Y_id] += cell_book_wire_area;
        }
    Else
        {
            Cover_X_low = cell_low_x / grid_size;
            Cover_Y_low = cell_low_y / grid_size;
            Cover_X_high = cell_high_x / grid_size;
            Cover_Y_high = cell_high_y / grid_size;
            For I = Cover_X_low to Cover_X_high
            For J = Cover_Y_low to Cover_Y_high
                {
                    Calculate the intersection of ubox and GRID[I, J]
                    GRID[I, J] += cell_book_wire_area *
                    (intersection_area / cell_outline_area);
                }
        }/* else */
}
```

It should be understood that other methods for calculating Book_Wire_Area can be implemented within the scope of the present invention. For example, in some routers, the metal wires inside of the cells are recorded. In such a case, the Book_Wire_Area can be calculated by summing these wires together.

Figure 4A:
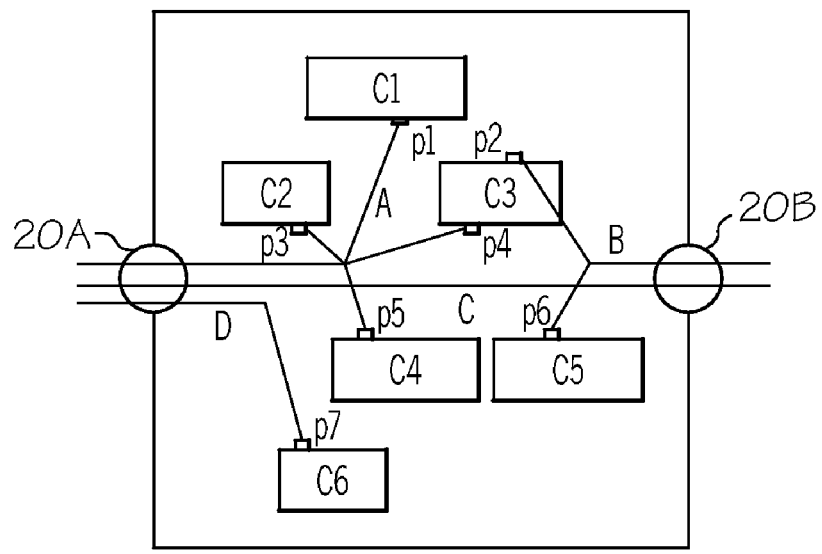
FIG. 4A-B depict exemplary global routing diagrams to illustrate the present invention.
Figure 4B:
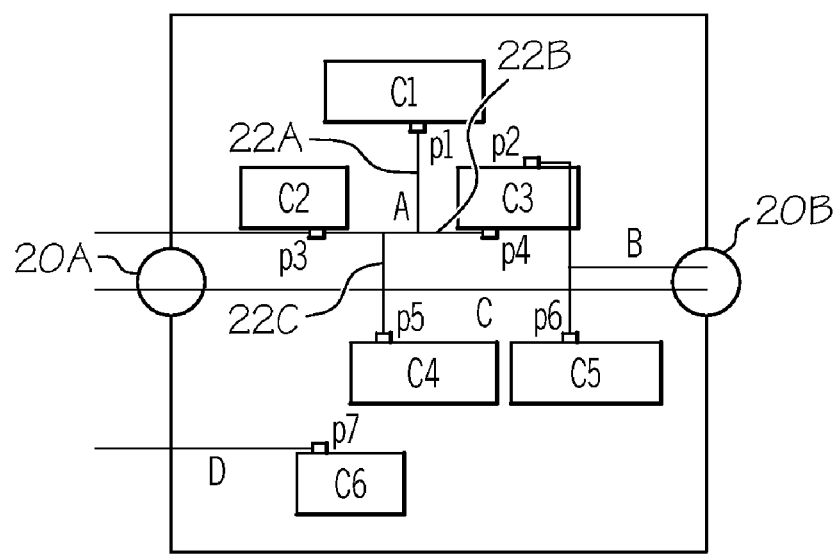

In any event, after the global routing, the global wire layer and width are determined. Specifically, the global routing establishes a routing grid. For each routing grid cell on a horizontal routing layer, there is one connection point on the "east" and "west" edges, respectively. Similarly, there are connection points on the "north" and "south" edges of the routing grid cell on vertical routing layers. The connection points typically represent the global wires from the outside. Referring to FIGS. 4A-B, points 20A-B represent the two connection points. Further, there are four nets A, B, C and D shown. The global wires should connect to the local wires/pins. The local routing inside a routing grid can be obtained by Steiner tree routing. For example, the routes 22A-D in FIG. 4B represent local routing for nets A and B, respectively. However, the connection between global wires and local wires are not decided at the global routing stage. Accordingly, the wire length of a global wire segment is not determined.

Therefore, the present invention employs a heuristic method to estimate the wire length of a global wire segment. In general, there are two cases: (1) The global wire segment traverses the routing grid cell. The length of this wire is the size of the routing grid cell. For example, the global wire segment C is from one connection point to the other; and (2) The global wire segment connects pins inside the routing grid cell. In this case, the bounding box of pins inside the routing grid cell is identified. The shortest connection from the west/east edge to the bounding box is the length of the global wire segment. For example, the global wire segment A is from the west edge to the bounding box of net A as shown in FIG. 4B. Once the lengths of the global wire segments are decided, Global_Wire_Area can be calculated accurately by adding the area of all wire segments inside the grid cell. Global wires may be changed during optimization, incremental Global_Wire_Area update is needed. When one net is rerouted, the area of the old wire segments are deducted, and the area of the new wire segments is added by tracing the grid cells along the old and new routes.

After global routing of interconnects of the chip has been performed, a local routing of interconnects of the chip is performed. One problem with local routing wires is that they may not have layers assigned. However, the density calculation is layer by layer. Accordingly, the present invention will "estimate" the layer assignment for local wires. In general, layers are assigned from bottom to top. Thus, local wires are assigned to their lowest "available" layers. For M1, most of wires are from books. From the above-computations, Book_Wire_Area has been determined. If Book_Wire_Area is larger than the threshold, it can be assumed that there are no routing resources left, and local wires in the grid cell should be assigned to higher layers. In addition, if there are blockages identified on a low layer, and it overlaps with the local wire segment, then the local wire segment should be assigned to a higher layer. In any event, once the layers of all wire segments are decided, Local_Wire_-Area can be calculated by adding the areas of all local wire segments together.

As mentioned above, the target of CMP is layout planarization. Under the present invention, the "target" CMP_density for each grid cell can be determined based on the estimation of Metal_Routing_Area. That is, if the "target" CMP_density is lower than Metal_Wire_density, rerouting of some wiring nets to other grid cells whose Metal_Wire_density is low should be considered. Cheesing also helps to reduce the density, but the constraint is that cheesing applies only on wide wires. On the other hand, if the "target" CMP_density is higher than Metal_Wire_density, dummy fills are need.

Accordingly, dummy fill estimation is performed under the present invention according to one or more filling rules. In general, the dummy fill depends strictly on layout geometry, and it has complicated rules to decide dummy fill locations. Furthermore, different fill patterns have different rules in the dummy fill process. However, after global routing, the track assignment is still not decided, which makes dummy fill estimation difficult. For example, the length and width of a Metal Fill shape is generally 4.5 times as large as the minimum line width for that wiring level. The closest approach of an MxFill shape to Mx is generally twice the minimum space for that metal level (e.g., as indicated in the CMS10SF Design Services Specification). Different geometry may lead to totally different amounts of dummy fills.

Figure 5A:
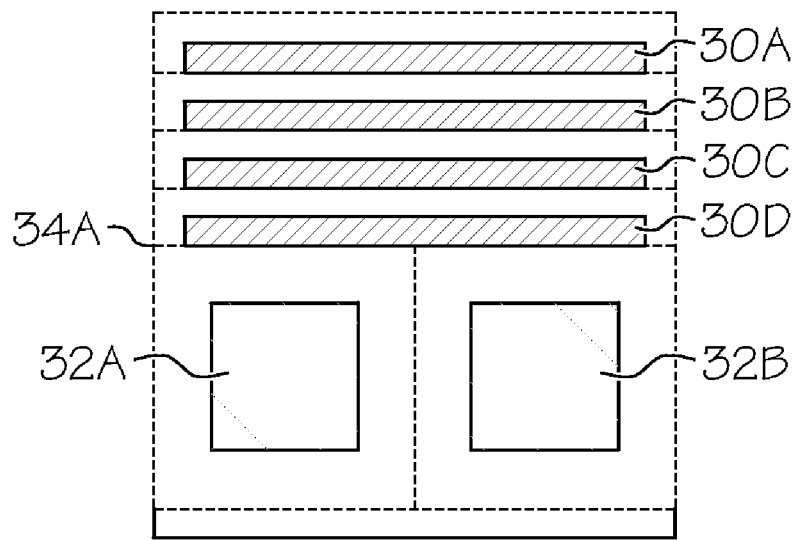
FIGS. 5A-B depict illustrative dummy fill diagrams to illustrate the present invention.
Figure 5B:
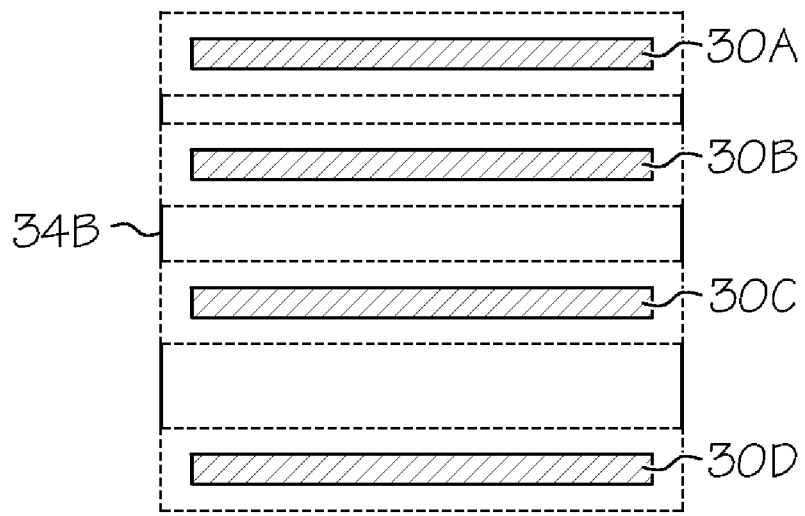

FIGS. 5A-B show two examples. In FIG. 5A, all routing wires 30A-D are packed closely, and two dummy fills 32A-B are inserted in the grid cell 34A. On the other hand, if the wire segments 30A-D are distributed as shown in FIG. 5B, no dummy fills can be inserted into grid cell 34B since the spacing between two wires is too small to fill a dummy feature.

The uncertainty of layout geometry often makes it difficult to estimate how many dummy fills can be inserted in a grid cell. One "compromise" approach is to determine the maximum number of dummy fills for each grid cell. In other words, given a set of horizontal (vertical) wire segments (the x coordinates of two end points are known, but y-coordinate is not fixed) and obstacles, layout including all objects in the set can be determined, and the layout can hold the maximum number of dummy fills.

Thus, by packing all wires toward one end of the grid cell with minimum spacing such as in FIG. 5A, "larger" room can be left for dummy fills compared to a layout which spreads wires apart. However, the accuracy of "maximum dummy fill" estimation may be affected greatly by the given set as well as the packing strategies employed. Where the wire segments have the same wire length and there are no obstacles, the above packing approach is typically sufficient for estimation. However, when the wire segments have different wire lengths, and there are no obstacles, both wire packing and wire ordering may affect maximum dummy fill estimation.

Figure 6A:
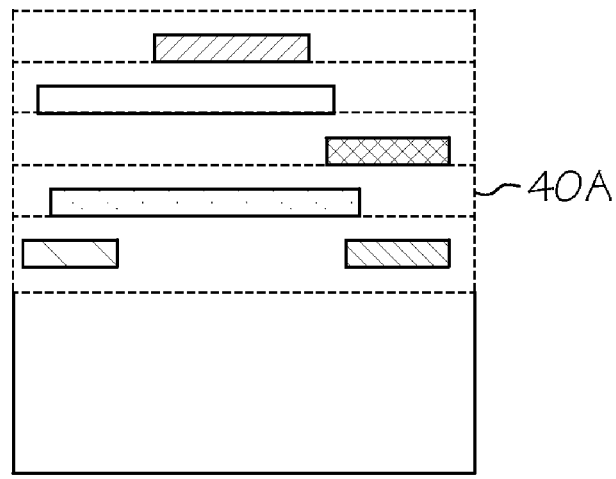
FIGS. 6A-B depict wire segment ordering diagrams to illustrate the present invention.
Figure 6B:
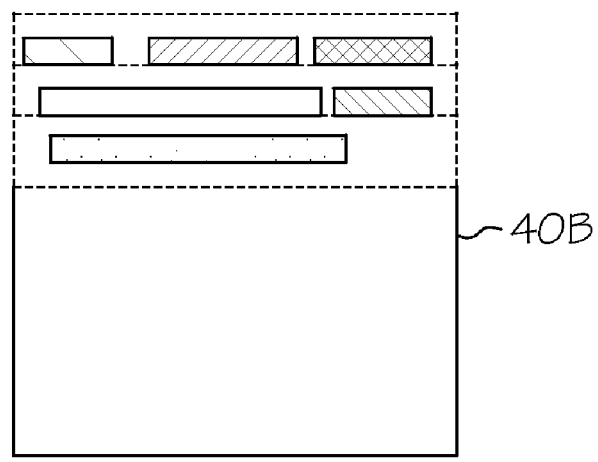
Figure 7A:
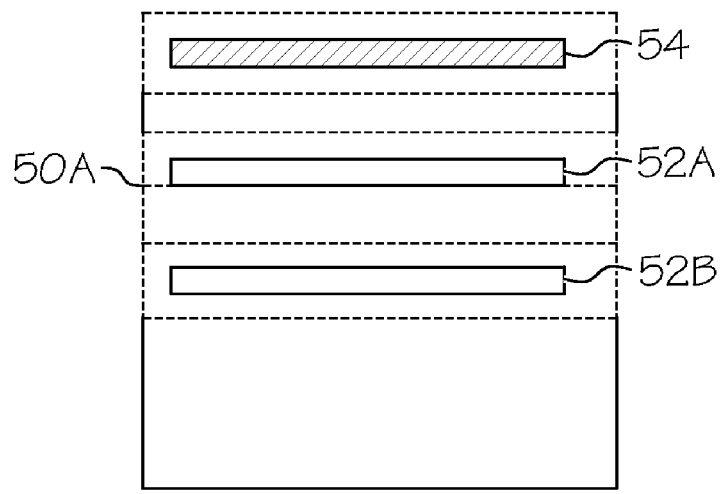
FIGS. 7A-B depict exemplary wire packing diagram to illustrate to the present invention.
Figure 7B:
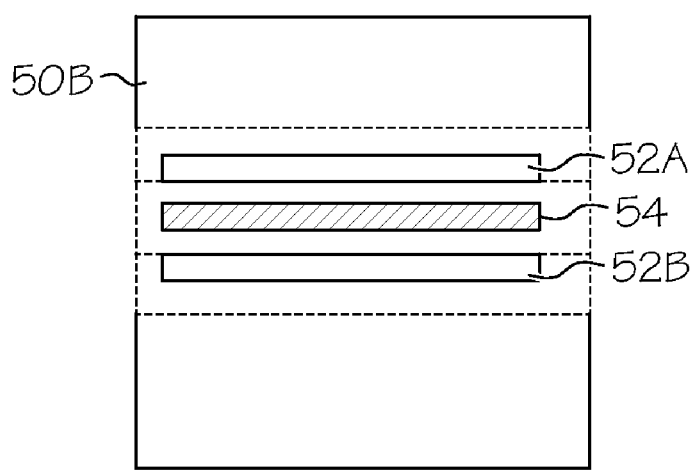

For example, referring to FIGS. 6A-B, it can be seen that grid cell 40B of FIG. 6B has a denser packing than grid cell 40A of FIG. 6A, although both pack wires with minimum spacing. Occasionally, packing wire segments around the fixed wires or blockages may lead to better results. For example, in grid cells 50A-B of FIGS. 7A-B, wire segments 52A-B are fixed wire segments and wire segment 54 is a "loose" wire segment. As shown in FIG. 7A, fixed wire segments 52A-B and loose wire segment 54 are packed upwards. However, the spacing between fixed wire segments 52A-B and loose wire segment 54 is too small to insert a dummy feature. Conversely, FIG. 7B depicts the loose wire segment 54 positioned between fixed wire segments 52A-B, which leaves more room for dummy fill.

Figure 8B:
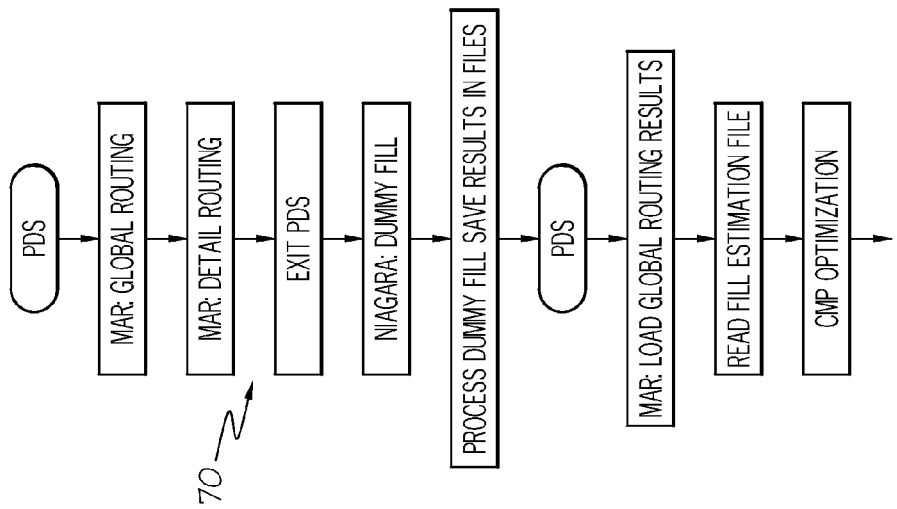
FIG. 8A-B depict two alternative method flow diagrams for performing dummy fill estimation according to the present invention.
Figure 8A:
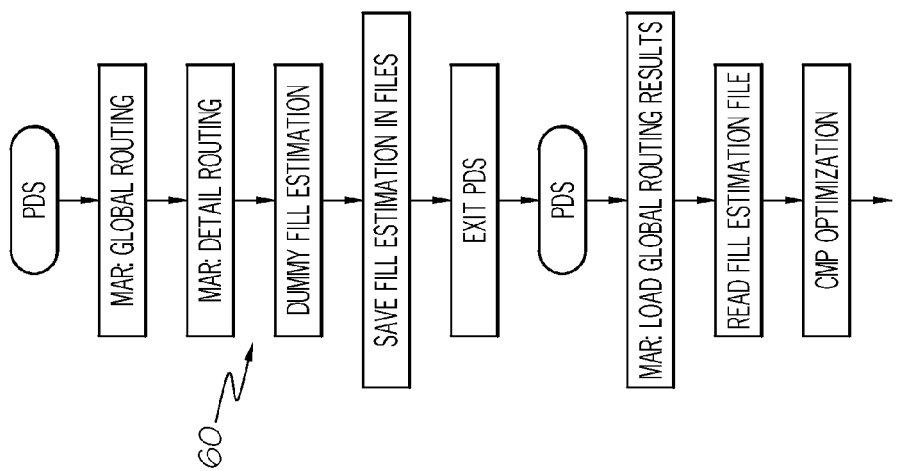

In the above approach, dummy fill estimation is based on the global routing of interconnects, and the accuracy of the fill estimation depends on the packing algorithm. As such, the typically embodiment of the present invention estimates dummy fills after the detail/local routing of interconnects is performed. As such, the dummy fill estimation should be more accurate. Since optimization for CMP has a relatively low priority under the present invention, it typically will be applied after other optimizations. Also it is assumed that the optimization would not change the existing design dramatically. As such, the present invention also incorporates another approach (called "double-PDS-run" approach), which is depicted in FIGS. 8A-B.

In this approach, the first step of PDS (Product Driven Synthesis) is to get a detailed/local routing solution so that we can calculate dummy fills. Then in the second run of PDS, the dummy fill estimation can be used for optimization. The difference between the two approaches represented in FIGS. 8A-B is that flow 60 illustrated in FIG. 8A uses dummy fill estimation inside PDS. While flow 70 outlined in FIG. 8B one uses "Niagara" to generate dummy fills. In the flow 60, dummy fill estimation is not supported in PDS and is implemented under the present invention. In the flow 70, Niagara processes and outputs "gl1" files, which are processed under the present invention to obtain the fill information.

Compared to flow 60, flow 70 calls PDS twice, and the detail/local routing result in the first PDS run is discarded. Although this causes a much longer running time, it provides improved accuracy. Under both flows 60 and 70, incremental dummy fill estimation should be provided. After wiring rerouting, some space for dummy fills may be created or consumed. Such changes should be traced, and the dummy fills in the related density grid cells should be adjusted. In the current situation, after reroute, both flows 60 and 70 may have wires whose tracks are not assigned. Then, an approximation algorithm is utilized to adjust the dummy fill estimation.

Figure 9:
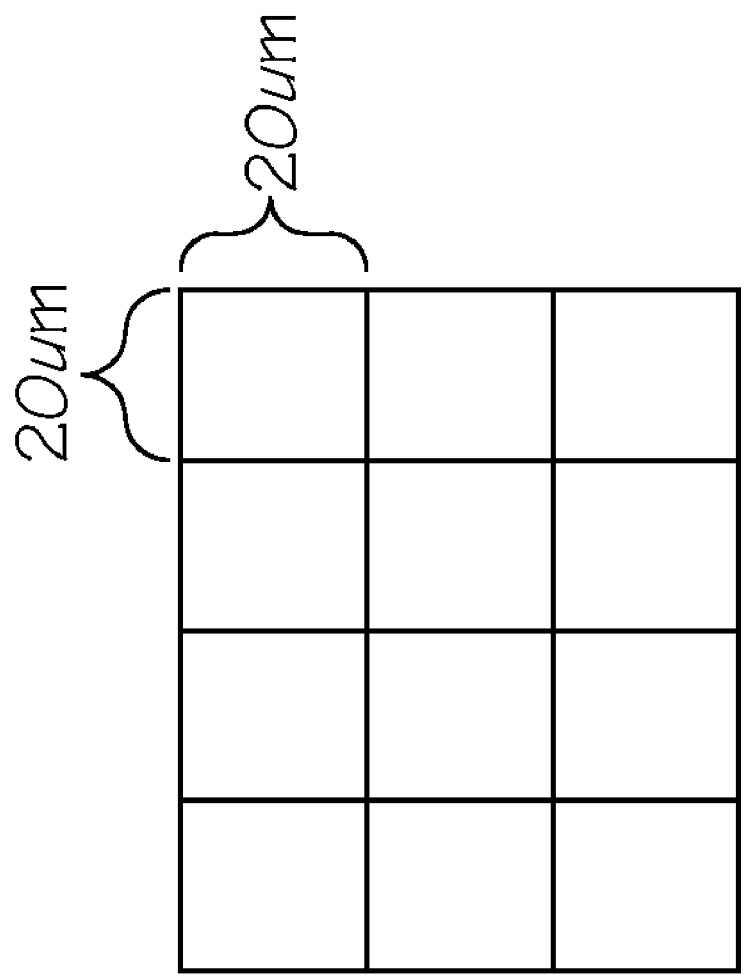
FIG. 9 depicts an illustrative routing grid according to the present invention.

Once grids based metal density estimation and dummy fill estimation are performed (in any order), a variable map of metal thicknesses is obtained (e.g., based on the CMP model discussed above). As indicated above, the routing area is represented by a routing grid, as shown in FIG. 9. Each grid shown is a 20×20 ($\mu m^2$) as determined by CMP modeling. CMP variation effect on each routing grid $G_i$ is expressed as a distribution ($m_i$, $\sigma_i$). Under the present invention, the thickness calculation is based on the following formulae:

$$\text{Thickness}=f(\text{density},\text{dummy\_fill})$$

$$\text{Line\_width}=g(\text{topography, density, fill, ...})$$

After a variable map of metal thicknesses is obtained, wiring nets that are sensitive to metal variability are identified based on the variable map. As indicated above, this is generally accomplished by applying tile based RC extraction to get the values of each wire segment. These values are then fed into a statistical timing tool (e.g., EinsStat). In general, wiring nets that are sensitive to metal variability will likely fail timing tests (e.g., fail to meet timing closure due to the metal thickness loss/gain in CMP).

Figure 10:
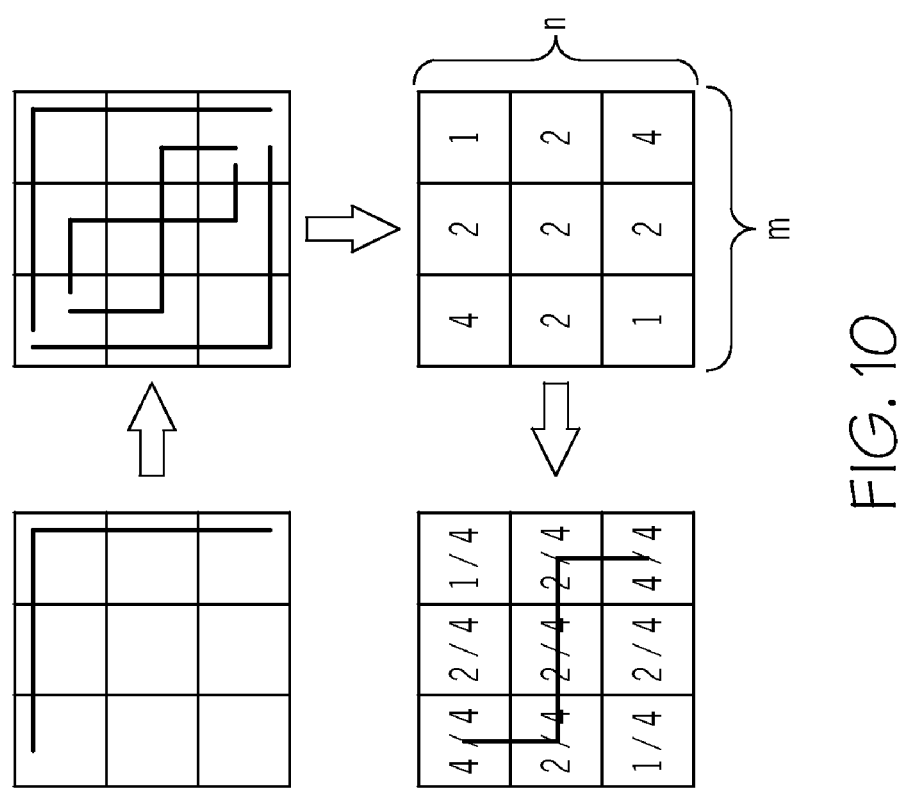
FIG. 10 depicts an exemplary diagram of wiring net rerouting to illustrate the present invention.

Once the sensitive wiring nets have been identified, they can be re-routed for optimization of the chip. In general, each wiring net usually has several equivalent ways to route. For example, a two-pin net from grid (0, 0) to grid (m, n) has m+n−2 possible 2-bend routes. These routes have the same wire length and use two vias. However, the routes may traverse different grid cells. Therefore, a routing path that is more tolerable to CMP process variation will be chosen under the present invention. Referring to FIG. 10, this is shown in greater detail. Specifically, under the present invention, the sensitive wiring nets are re-routed to redistribute ($m_i$, $\sigma_i$) over all routing grids without changing net length significantly, or to match the variability to the corresponding clock path metal variability.

III. Computerized Implementation

Figure 11:
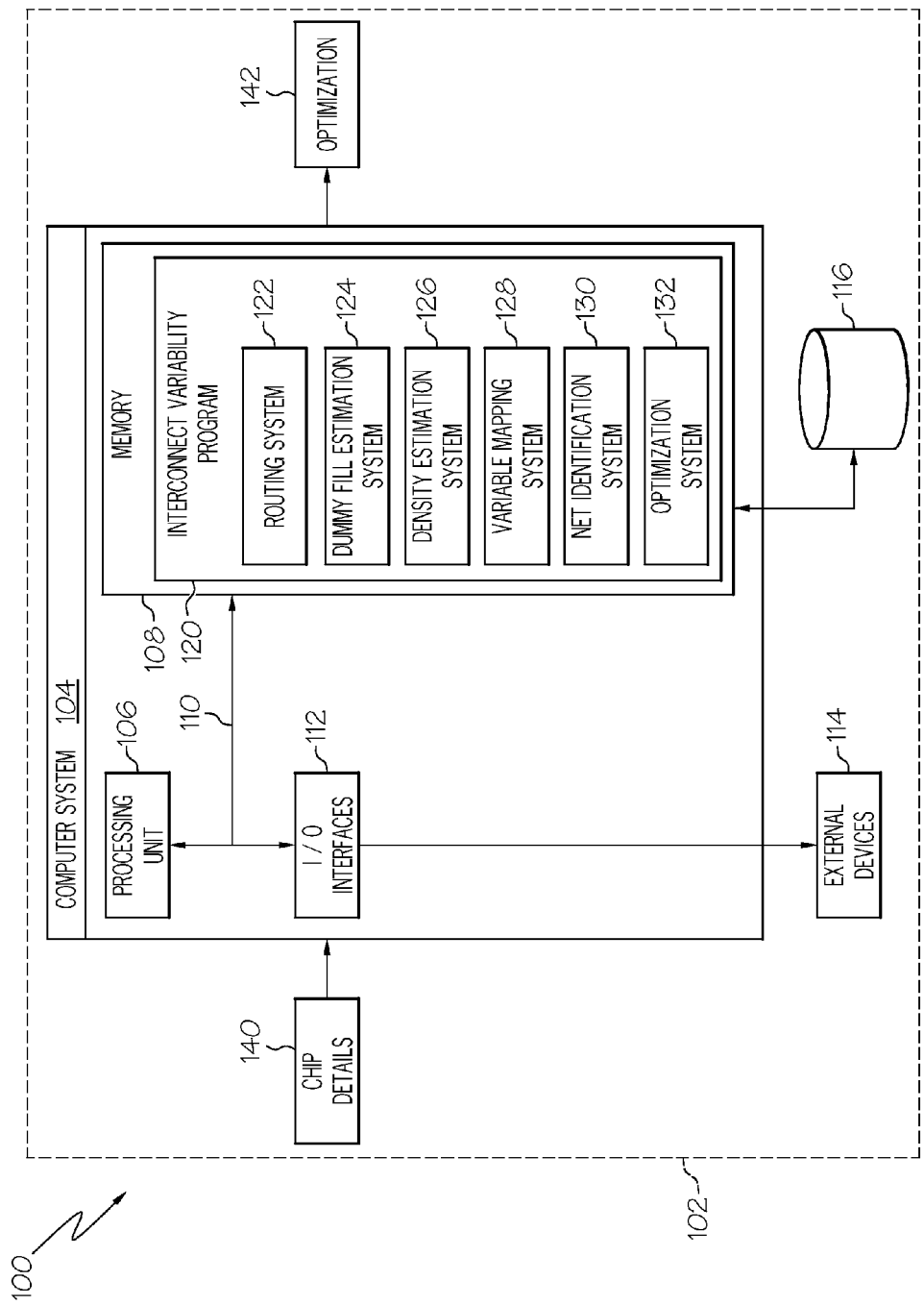
FIG. 11 depicts a computerized implementation according the present invention.

Referring now to FIG. 11, a more specific computerized implementation 100 of the present invention is shown. As depicted, implementation 100 includes a computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to mitigate effects of interconnect variability during a design stage of a chip.

As shown, computer system 104 includes a processing unit 106, a memory 108, a bus 110, and input/output (I/O) interfaces 112. Further, computer system 104 is shown in communication with external I/O devices/resources 112 and storage system 116. In general, processing unit 106 executes computer program code, such as interconnect variability program 120, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external devices 114. Still further, it is understood that one or more additional components (e.g., system software, math co-processing unit, etc.) not shown in FIG. 11 can be included in computer system 104. However, if computer system 104 comprises a handheld device or the like, it is understood that one or more external devices 114 (e.g., a display) and/or storage system(s) 116 could be contained within computer system 104, not externally as shown.

Storage system 116 can be any type of system (e.g., a database) capable of providing storage for information under the present invention, such as chip details 140, chip optimization 142, etc. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). Although not shown, additional components, such as cache memory, communication systems, system software, etc., may be incorporated into computer system 104.

Shown in memory 108 of computer system 104 is interconnect variability program 120, which is a software program that will provide the functions of the present invention, and which includes routing system 122, dummy fill estimation system 124, density estimation system 126, variable mapping system 128, net identification system 130, and optimization system 132. In general, these systems represent program code that carries out the steps of the present invention as described above. Specifically, routing system 122 performs global and local routing of interconnects. Dummy fill estimation system 124 performs the dummy fill estimation based on estimated densities of the global and detailed routing of the interconnects. Density estimation system 126 performs grid based metal density estimation. Variable mapping system 128 obtains the variable map of metal thicknesses based on a CMP model. Net identification system 130 identifies wiring nets of the chip that are sensitive to metal variability based on the variable map. To this extent, net identification system 130 can incorporate a statistical timing tool such as EinsStat to apply one or more timing tests. Optimization system 132 re-routes the wiring nets during the design stage for optimization of the chip.

While shown and described herein as a method and system mitigating effects of interconnect variability during a design stage of a chip, it is understood that the invention further provides various alternative embodiments. For example, in one embodiment, the invention provides a computer-readable/useable medium that includes computer program code to enable a computer infrastructure to mitigate effects of interconnect variability during a design stage of a chip. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 11) and/or storage system 116 (FIG. 11) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to mitigate effects of interconnect variability during a design stage of a chip. In this case, the service provider can create, maintain, support, etc., a computer infrastructure, such as computer infrastructure 102 (FIG. 11) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for mitigating effects of interconnect variability during a design stage of a chip. In this case, a computer infrastructure, such as computer infrastructure 102 (FIG. 11), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 104 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer system for mitigating effects of interconnect variability during a design stage of a chip and prior to manufacturing of the chip, comprising:
    a routing system for performing global and detailed routing of interconnects of the chip;
    a dummy fill estimation system for performing dummy fill estimation that estimates the maximum amount of locations available for metal dummy fills based on the global and detailed routing of the interconnects;
    a density estimation system for performing grid based metal density estimation by estimating density of metal in each grid cell;
    a variable mapping system for obtaining a variable map of metal thicknesses;
    a net identification system for identifying wiring nets of the chip that are sensitive to metal variability based on the variable map of metal thicknesses and the dummy fill estimation; and
    an optimization system for re-routing the wiring nets during the design stage and prior to the manufacturing of the chip for metal density based optimization of the chip, the re-routing being performed to substantially maintain a length of the sensitive nets.

2. The system of claim 1, the variable map being obtained based on a Chemical-Mechanical Polishing (CMP) model, and the wiring nets being further identified based on a failed timing test.

3. The system of claim 1, the grid based metal density estimation being performed for each grid cell of the chip.

4. A non-transitory computer readable medium comprising a program product stored on a computer readable storage medium for mitigating effects of interconnect variability during a design stage of a chip and prior to manufacturing of the chip, the computer readable medium comprising program code for causing a computer system to perform the following steps:
    performing global and detailed routing of interconnects of the chip;
    performing dummy fill estimation that estimates the maximum amount of locations available for metal dummy fills based on the global and detailed routing of the interconnects;
    performing grid based metal density estimation that estimates density of metal in each grid cell;
    obtaining a variable map of metal thicknesses;
    identifying wiring nets of the chip that are sensitive to metal variability based on the variable map of metal thicknesses and the dummy fill estimation; and
    re-routing the wiring nets during the design stage and prior to the manufacturing of the chip for metal density optimization of the chip, the re-routing being performed to substantially maintain a length of the sensitive nets.

5. The program product of claim 4, the variable map being obtained based on a Chemical-Mechanical Polishing (CMP) model, and the wiring nets being further identified based on a failed timing test.

6. The program product of claim 4, the grid based metal density estimation being performed for each grid cell of the chip.

7. A method for deploying an application for mitigating effects of interconnect variability during a design stage of a chip and prior to manufacturing of the chip, comprising:
    providing a computer infrastructure being operable to:
        perform global and detailed routing of interconnects of the chip;
        perform dummy fill estimation that estimates the maximum amount of locations available for metal dummy fills based on the global and detailed routing of the interconnects;
        perform grid based metal density estimation that estimates density of metal in each grid cell;
        obtain a variable map of metal thicknesses;
        identify wiring nets of the chip that are sensitive to metal variability based on the variable map of metal thicknesses and the dummy fill estimation; and
        re-route the wiring nets during the design stage and prior to the manufacturing of the chip for metal density based optimization of the chip, the re-routing being performed to substantially maintain a length of the sensitive nets.

8. The method of claim 7, the variable map being obtained based on a Chemical-Mechanical Polishing (CMP) model, and the wiring nets being further identified based on a failed timing test.

9. The method of claim 7, the grid based metal density estimation being performed for each grid cell of the chip.

* * * * *